(12) United States Patent
Russo

(10) Patent No.: US 7,873,730 B2
(45) Date of Patent: Jan. 18, 2011

(54) METHOD AND SYSTEM FOR COLLABORATIVE COMPUTING ENVIRONMENT ACCESS RESTRICTION AND ORPHAN DATA MANAGEMENT

(75) Inventor: Joseph A. Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 2138 days.

(21) Appl. No.: 10/705,372

(22) Filed: Nov. 10, 2003

(65) Prior Publication Data

US 2005/0102359 A1 May 12, 2005

(51) Int. Cl.
*G06F 13/00* (2006.01)
(52) U.S. Cl. .................. 709/225; 709/224; 707/785
(58) Field of Classification Search .......... 709/223, 709/224, 225, 250; 707/783, 784, 785
See application file for complete search history.

(56) References Cited

U.S. PATENT DOCUMENTS

| | | | |
|---|---|---|---|
| 6,647,388 B2* | 11/2003 | Numao et al. ............... 707/9 |
| 6,708,171 B1* | 3/2004 | Waldo et al. ................. 1/1 |
| 7,013,284 B2* | 3/2006 | Guyan et al. ................ 705/9 |
| 7,032,006 B2* | 4/2006 | Zhuk ......................... 709/206 |
| 7,356,840 B1* | 4/2008 | Bedell et al. ............... 726/13 |
| 2003/0021283 A1* | 1/2003 | See et al. .................. 370/401 |
| 2003/0097383 A1* | 5/2003 | Smirnov et al. ........... 707/204 |
| 2003/0101086 A1* | 5/2003 | San Miguel ................ 705/9 |
| 2004/0213258 A1* | 10/2004 | Ramamoorthy ......... 370/395.1 |

* cited by examiner

*Primary Examiner*—Viet Vu
(74) *Attorney, Agent, or Firm*—Daniel McLoughlin, Esq.; Steven M. Greenberg, Esq.; Carey Rodriguez Greenberg & Paul LLP

(57) ABSTRACT

A method and system for collaborative computing environment access restriction and orphan data management is provided in the form of establishment and implementation of a data handling policy in which the data handling policy for one of a person and a role is stored on a computer storage medium. The data handing policy is implemented in the collaborative computing environment by providing access to data in accordance with the established data handling policy. Access to the data handling policy is provided to a person affected by the data handling policy in which the access to the data handling policy includes allowing the affected person to view the data handling policy.

18 Claims, 2 Drawing Sheets

METHOD AND SYSTEM FOR COLLABORATIVE COMPUTING ENVIRONMENT ACCESS RESTRICTION AND ORPHAN DATA MANAGEMENT

BACKGROUND OF THE INVENTION

1. Statement of the Technical Field

The present invention relates to collaborative computing environments and, in particular, to collaborative computing environment access restriction and orphan data policy.

2. Description of the Related Art

Collaborative computing provides a means for users to pool their strengths and experiences to achieve a common goal. For example, a common goal may be an educational objective, the completion of a software development project or even creation and use of a system to manage human resources. The establishment of a collaborative computing environment typically involves the creation or definition of a community. The community provides the framework under which the collaborative computing objective is achieved.

A collaborative computing community is defined by (1) a particular context, i.e. the objective of the community, (2) membership, i.e., the participants in the community, and (3) a set of roles for the community members. Roles are names given to persons in the community which dictate access to the community's resources and tools as well as define the behavior of the community members through the implementation of community rules and policies. For example, roles in a community relating to an on-line education system may include Teacher and Student. The role named "Teacher" is likely given access to places and permissions broader is scope than those for the role named "Student".

Teachers may be given access to class-wide and teachers-only discussion lists and grades databases within the community, while Students may be given access to the class-wide discussion lists and a students-only discussion list. While both roles have access to the class-wide discussion lists, the role named Teacher may be given the ability to create, delete and view discussion threads, while the role named Student may be given access only to view the class-wide discussion lists. Further, Teachers behavior may be defined so that they can initiate or schedule web-based classes while Students can only participate, i.e., join, scheduled classes.

Further, the role named teacher may be able to grant permission to the students to join certain discussion lists or to create a folder which is private to, and only accessible by the student. Under this arrangement, a person is added to a place in a capacity under which the person, the Student in this example, can create new content and edit some existing content. In addition, the person can restrict access to data he/she owns. However, this form of access restriction creates a perception of a certain data security for this person which may not be accurate. Others may really be able to access the data that the person thought was secure. For example, the Teacher in the above example, may have access to the Student's data even though this does not appear to be the case from the Student's perspective. It is therefore desirable to have a system and method under which a person obtains a true and accurate picture of the third party accesses which will be available to the person's data.

An additional problem is created in situations where a person leaves the system or is removed from the collaborative computing system or community, yet has data he/she has created or controls. An example of this scenario occurs when the last manager of the content is deleted from the system. This data is referred to as orphaned data because it is becomes data with no owner. Current systems provide one of three solutions for orphaned data. First, orphaned data can be deleted from the system. This solution can obviously be problematic as needed content may be deleted and rendered permanently unavailable. Second, orphaned data can be made available to the person's manager or other designated administrative entity.

In a pure intranet scenario, this action may be assumed by users of the system. However, such is not necessarily the case in a hosted or internet scenario. This option conveys a false sense of security to the person because they typically have no idea that their content will be made available to others. In other words, the person's expectation of privacy can really be a falsity. Third, orphaned data can be copied to a designated location. It is desirable to have a system and method which provides a set of engagement policies configurable on a person-by-person (user-by-user) basis which sets out to users what content and resource access truly means in their operating environment and what happens with orphaned data.

SUMMARY OF THE INVENTION

The present invention addresses the deficiencies of the art in respect to clearly establishing and communicating content access restriction and orphan data policy to users and provides a novel and non-obvious method, system and apparatus for collaborative computing environment access restriction and orphan data management. Methods consistent with the present invention provide a method for a data handling policy in a collaborative computing environment. The data handling policy for one of a person and a role is stored on a computer storage medium. The data handling policy is implemented in the collaborative computing environment by providing access to data in accordance with the established data handling policy. Access to the data handling policy is provided to a person affected by the data handling policy in which the access to the data handling policy includes allowing the affected person to view the data handling policy.

Systems consistent with the present invention include a system for handling data access in a collaborative computing environment in which the system includes a computer having a database and a central processing unit. The database stores the data handling policy for a person and/or a role. The central processing unit implements the data handling policy by providing access to data in accordance with the established data handling policy and by providing access to the data handling policy to a person affected by the data handling policy. Access to the data handling policy includes allowing the affected person to view the data handling policy.

As still another aspect, the present invention provides a computer-readable storage medium storing a computer program which when executed performs a collaborative computing method in which the data handling policy for one of a person and a role is stored. The data handling policy is implemented in the collaborative computing environment by providing access to data in accordance with the established data handling policy. Access to the data handling policy is provided to a person affected by the data handling policy. The access to the data handling policy includes allowing the affected person to view the data handling policy.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
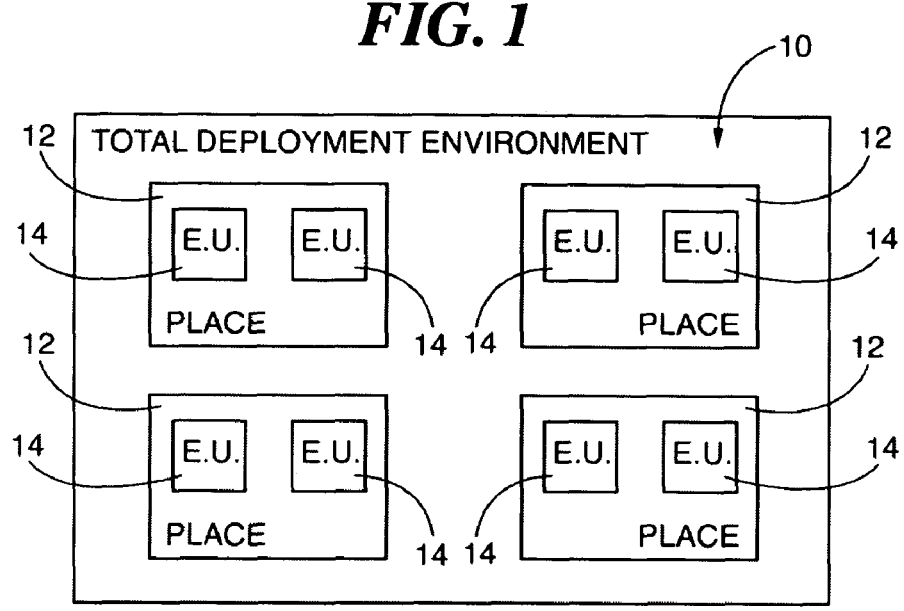
FIG. 1 is a block diagram of a hierarchy of a typical collaborative computing deployment environment constructed in accordance with the principles of the present invention.

The present invention is a system and method for a collaborative computing environment which provides data handling policy at least in the form access restriction and orphan data management for the total deployment environment, place, user or any combination thereof. Referring now to the drawing figures in which like reference designators refer to like elements, there is shown in FIG. 1 a block diagram of a hierarchy of a typical collaborative computing deployment environment constructed in accordance with the principles of the present invention and designated generally as 10. Each collaborative computing deployment environment 10 includes one or more places 12 which in turn are accessible by one or more end user persons 14, i.e. members of the community. Each place 12 represents a collaborative computing community provided within the total collaborative computing deployment environment 10.

As is described below in detail, it is contemplated that access and orphan data policy can be established for one or more of environment 10, each individual place 12 and each end user person 14. The access and orphan data policy can be grouped together under a single reference and referred to together as permission sets. Permission sets can be given names for identification purposes and are thus named permission sets. With respect to each end user person 14, end users are defined by roles within each place such that access and orphan data policy can be established for a particular end user or for the role corresponding to end user person 14 through the attachment of a named permission set to a particular role. For example, the access and orphan data policy can be established for a specific end user and/or for a role such as teacher, student, etc.

By allowing content access and orphan data policy to be defined at the deployment, place, role and user levels, the collaborative computing system advantageously allows system designers to define and implement content access and orphan data policy at any level of desired granularity. For example, the present invention advantageously allows end user persons 14 whose roles include access policy such that they can create discussion lists, folders, etc.; the ability to provision those business interfaces and define policy which provides certain other roles with the ability to view, modify, etc. the content therein. In other words, a role whose policy includes acting as a manger may be provided with the ability to define policy for certain other roles.

Figure 2:
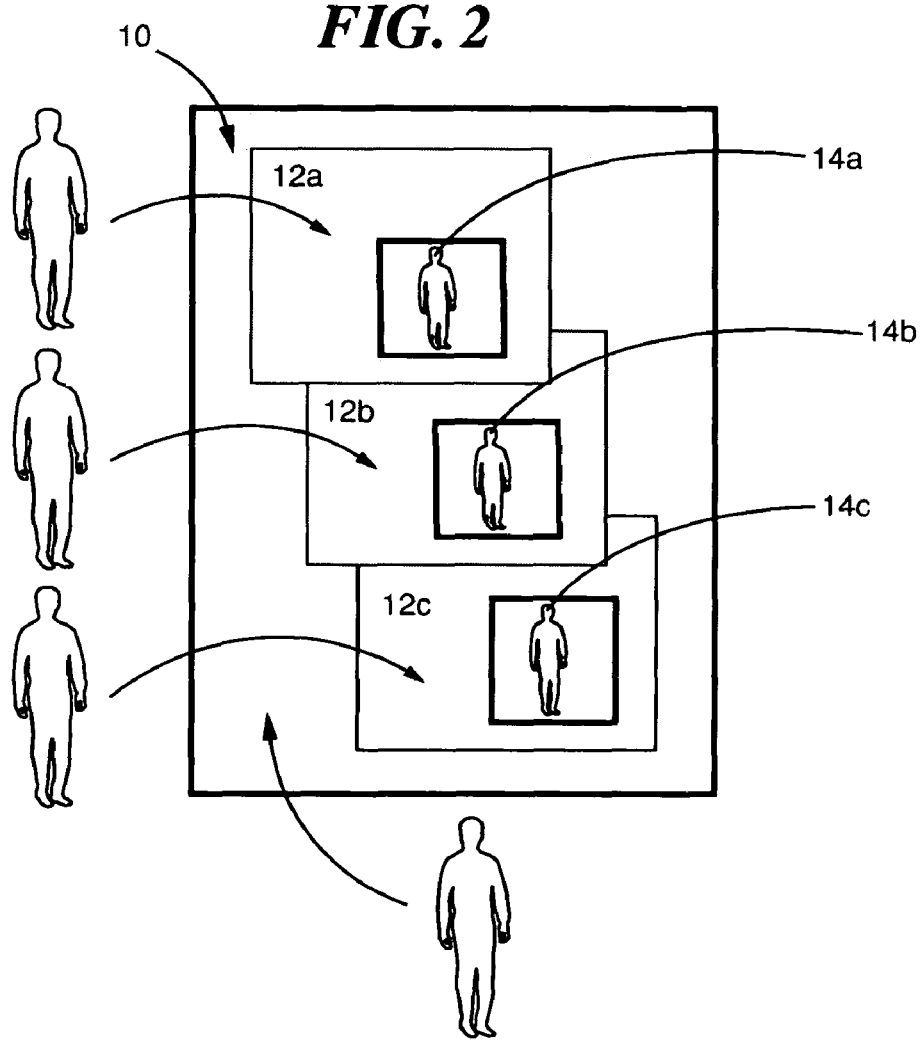
FIG. 2 is an iconic diagram showing the organization of roles, access and engagement policies for the system constructed in accordance with the principals of the present invention.

FIG. 2 is an iconic diagram showing the organization of roles, access and engagement policies for the system constructed in accordance with the principles of the present invention. As shown in FIG. 2, collaborative computing deployment environment 10 includes places 12a, 12b and 12c. The access and engagement policies for collaborative computing deployment environment 10 are maintained by deployment administrator 16. Each of places 12a, 12b and 12c (collectively referred to herein as 12) as a corresponding place administrator 18a, 18b and 18c, respectively (collectively refer to herein as place administrators 18). End user person 14a, 14b and 14c (collectively refer to herein as end user persons 14) are members of places 12a, 12b and 12c respectively.

In accordance with the present invention, deployment administrator 16 enables the various engagement policy settings for all places 12 created in deployment environment 10. Such policies address orphaned data items, hidden data items, private data items and how the system handles situations in which an end user person 14 or place administrator 18 is removed and then re-added to a place. Hidden data items refers to items which existed within a place or end user environment which are not accessible by particular roles. Private data items refers to those data items within a place or end user environment which are available only to those with particular roles. With respect to orphan data items, policies can be established such that, when data is orphaned, certain roles can see the data. In the alternative, orphaned data policy can establish that data orphaned data is copied to a particular location and made available to certain roles. Finally, orphaned data policy can provide that orphan data is deleted. This policy can be established on a deployment-wide environment by deployment administrator 16.

Place administrator 18 can establish the above-described access and engagement policies at the place level. It is also contemplated that deployment administrator 16 can delegate the ability to enable engagement policies at the place 12 level by providing such authorization to one or more place administrators 18a, 18b, 18c, etc. In other words, deployment administrator 16 can establish policy at the deployment environment 10 level and/or can allow place administrators 18 to establish policy at the place 12 level. Of note, the discrete provision and description of place administrators 18 and end user persons 14 is provided herein solely for ease of explanation, it being understood that place administrators 18 can be end user persons 14 within a particular place 12.

End user persons 14 can additionally be provided with the ability to set access and data policies within their own environment within a place 12. The present invention additionally provides the ability for end user persons 14 to view engagement policies which effect them in their place 12 to understand the rules of data security within the place 12 and, as discussed above, be provided with the ability to make some setting changes that have been enabled for end users by place administrator 18 and/or deployment administrator 16.

As such, the present invention advantageously provides a mechanism under which end user persons 14 have knowledge of the data policy and, in particular, the orphan data policy associated with their role in a place 12 so that they can base their interaction within place 12 having knowledge of the policy. For example, an end user person 14 can be provided with a display screen such as that shown as computer monitor display screen 22 in FIG. 3 or receive some other type of notification as to the existence of a data handling policy which affects him or her. The notification can be coupled with the ability for the affected end user person 14 to view the data handling policy which affects him or her.

Figure 3:
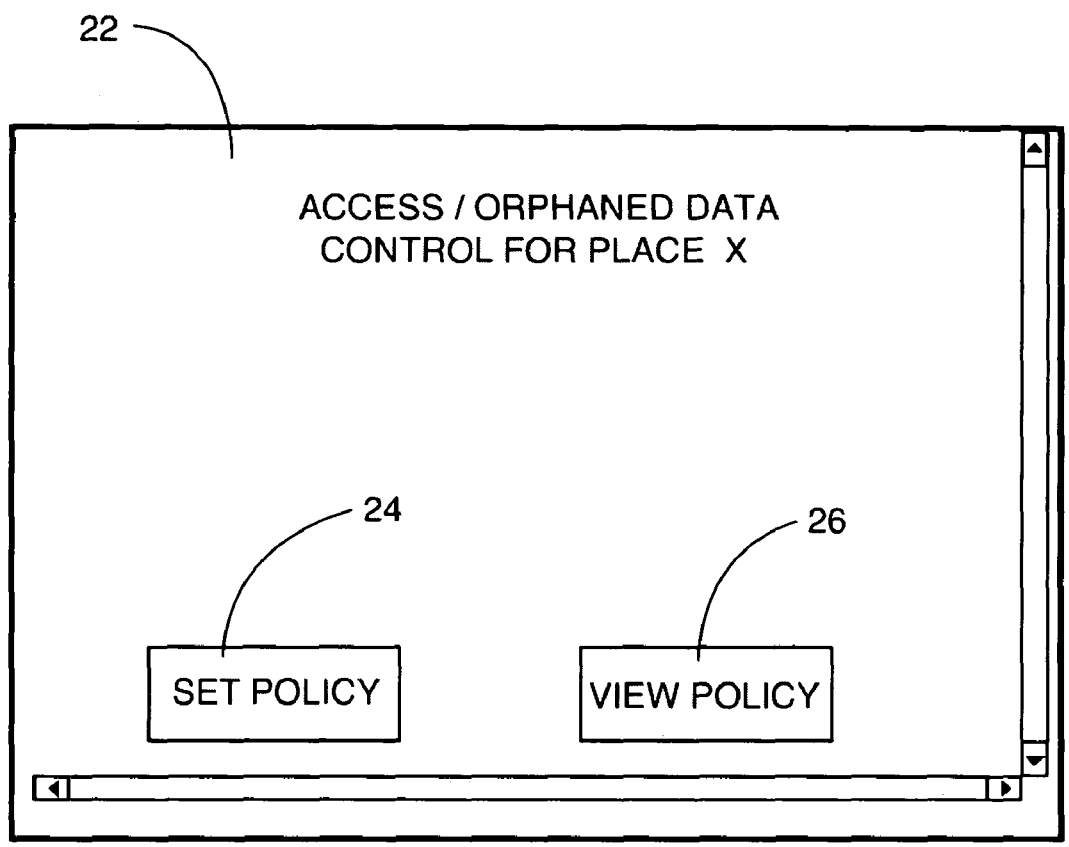
FIG. 3 is a drawing of an exemplary computer display screen showing a way to access data handling policy view and configuration display screens.

As shown in FIG. 3, display screen 22 identifies a particular place and provides set policy button 24 and view policy button policy 26. Buttons 24 and 26 are arranged to be selectable as is known in the art such as by using a pointing or other device to make selections from a graphical user interface. Selecting set policy button 24 provides the end user person 14 with a display screen, which allows the user to set and establish policies for which the user has been authorized by place administrator 18 and /or deployment administrator 16. Selecting view policy button 26 provides the user with a display screen showing the user policies for that particular place, including orphan data, hidden data and private data policy. In this manner, end user persons 14 are provided with clear indications that there are polices which will effect their access and interaction within place 12 and provide an efficient way for the user to obtain knowledge of these polices.

Of course, other methods for providing user access to data handling policy which effects that user can be employed, such as drop down menus, electronic mail, etc. For example, a display screen providing a community membership view which allows membership management can be arranged to allow selection of a user which, in turn, results in the generation and display of a display screen which show the access and/or orphan data policy corresponding to the selected user.

The present invention can be realized in hardware, software, or a combination of hardware and software. For example, the data handling policy can be stored in a database. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein. For example, the data handling policy can be stored in a database.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

I claim:

1. A method for a data handling policy in a collaborative computing environment, the method comprising:

storing the data handling policy for one of a person and a role on a computer storage medium;

implementing the data handling policy in the collaborative computing environment by providing access to orphaned data in accordance with the established data handling policy; and providing access to the data handling policy to a person affected by the data handling policy, the access to the data handling policy including allowing the affected person to view the data handling policy.

2. The method according to claim 1, wherein the treatment of orphaned data includes one of deleting the orphaned data and providing access to the orphaned data to a person other than the owner of the orphaned data.

3. The method according to claim 1, further including configuring the system to allow one or more of predetermined roles and users to have authority to configure the data handling policy.

4. The method according to claim 3, wherein the at least one of the predetermined roles and users having authority to configure the data handling policy corresponds to a place administrator, the place administrator having authority to configure the data handling policy within a predetermined collaborative computing place.

5. The method according to claim 4, wherein implementing the data handling policy includes authorizing one or more end user persons to configure data access policy for data relating the one or more end user persons.

6. The method according to claim 3, wherein the at least one of the predetermined roles and users having authority to configure the data handling policy corresponds to a deployment administrator, the deployment administrator having authority to configure the data handling policy within the entirely of collaborative computing deployment environment.

7. The method according to claim 1, wherein providing access to the data handling policy further includes notifying the affected person of the existence of the data handling policy.

8. A computer-readable storage medium storing a computer program which when executed performs a collaborative computing method comprising:

storing the data handling policy for one of a person and a role;

implementing the data handling policy in the collaborative computing environment by providing access to orphaned data in accordance with the established data handling policy; and providing access to the data handling policy to a person affected by the data handling policy, the access to the data handling policy including allowing the affected person to view the data handling policy.

9. The computer-readable storage medium according to claim 8, wherein the treatment of orphaned data includes one of deleting the orphaned data and providing access to the orphaned data to a person other than the owner of the orphaned data.

10. The computer-readable storage medium according to claim 8, wherein the method performed by the stored computer program when executed further includes configuring the system to allow one or more of predetermined roles and users to have authority to configure the data handling policy.

11. The computer-readable storage medium according to claim 10, wherein the at least one of the predetermined roles and users having authority to configure the data handling policy corresponds to a place administrator, the place administrator having authority to configure the data handling policy within a predetermined collaborative computing place.

12. The computer-readable storage medium according to claim 11, wherein implementing the data handling policy includes authorizing one or more end user persons to configure data access policy for data relating the one or more end user persons.

13. The computer-readable storage medium according to claim 10, wherein the at least one of the predetermined roles and users having authority to configure the data handling policy corresponds to a deployment administrator, the deployment administrator having authority to configure the data handling policy within the entirely of collaborative computing deployment environment.

14. The computer-readable storage medium according to claim 8, wherein providing access to the data handling policy further includes notifying the affected person of the existence of the data handling policy.

15. A system for handling data access in a collaborative computing environment, the system comprising a computer having:
    a database, the database storing the data handling policy for one of a person and a role; and
    a central processing unit, the central processing unit implementing the data handling policy by providing access to orphaned data in accordance with the established data handling policy and providing access to the data handling policy to a person affected by the data handling policy, the access to the data handling policy including allowing the affected person to view the data handling policy.

16. The system according to claim 15, wherein providing access to the data handling policy further includes notifying the affected person of the existence of the data handling policy.

17. The system according to claim 15, wherein the central processing unit performs the function of allowing one or more of predetermined roles and users to have authority to configure the data handling policy.

18. The system according to claim 17, wherein the at least one of the predetermined roles and users having authority to configure the data handling policy corresponds to a place administrator, the place administrator having authority to configure the data handling policy within a predetermined collaborative computing place.

* * * * *